(12) United States Patent
Mentak

(10) Patent No.: US 7,354,980 B1
(45) Date of Patent: Apr. 8, 2008

(54) HIGH REFRACTIVE INDEX POLYMERS FOR OPHTHALMIC APPLICATIONS

(75) Inventor: Khalid Mentak, San Ramon, CA (US)

(73) Assignee: Key Medical Technologies, Inc., San Ramon, CA (US)

( * ) Notice: Subject to any disclaimer, the term of this patent is extended or adjusted under 35 U.S.C. 154(b) by 260 days.

(21) Appl. No.: 11/079,666

(22) Filed: Mar. 14, 2005

Related U.S. Application Data

(60) Provisional application No. 60/552,548, filed on Mar. 12, 2004.

(51) Int. Cl.
*C08F 220/12* (2006.01)
*C08F 222/12* (2006.01)

(52) U.S. Cl. .................... 526/318.1; 526/317.1; 526/318; 623/5.11; 623/6.11

(58) Field of Classification Search ........... 526/317.1, 526/318, 318.1; 623/5.11, 6.11
See application file for complete search history.

(56) References Cited

U.S. PATENT DOCUMENTS

| | | | |
|---|---|---|---|
| 2,461,460 A | 2/1949 | Winnek |
| 2,989,529 A | 6/1961 | Schuler |
| 4,304,895 A | 12/1981 | Loshaek |
| 4,390,676 A | 6/1983 | Loshaek |
| 4,528,311 A | 7/1985 | Beard |
| 4,595,548 A | 6/1986 | St. Clair et al. |
| 4,603,061 A | 7/1986 | St. Clair et al. |
| 4,611,892 A | 9/1986 | Kawashima |
| 4,636,212 A | 1/1987 | Posin |
| 4,719,248 A | 1/1988 | Bambury |
| 4,731,079 A | 3/1988 | Stoy |
| 4,834,750 A | 5/1989 | Gupta |
| 4,851,521 A | 7/1989 | della Valle et al. |
| 4,863,539 A | 9/1989 | Lee |
| 4,872,877 A | 10/1989 | Tiffany |
| 5,080,688 A | 1/1992 | Cohen |
| 5,093,408 A | 3/1992 | Jung |
| 5,098,445 A | 3/1992 | Hung |
| 5,132,384 A | 7/1992 | Matsuda |
| 5,194,544 A | 3/1993 | Goldberg |
| 5,217,491 A | 6/1993 | Vanderbilt |
| 5,290,892 A | 3/1994 | Namdaran |
| 5,326,506 A | 7/1994 | Vanderbilt |
| 5,331,073 A | 7/1994 | Weinschenk |
| 5,338,826 A | 8/1994 | St. Clair et al. |
| 5,359,021 A | 10/1994 | Weinschenk |
| 5,374,663 A | 12/1994 | Daicho |
| 5,403,901 A | 4/1995 | Namdaran |
| 5,428,102 A | 6/1995 | St. Clair et al. |
| 5,433,746 A | 7/1995 | Namdaran |
| 5,470,932 A | 11/1995 | Jinkerson |
| 5,480,950 A | 1/1996 | Wang |
| 5,496,368 A | 3/1996 | Wiese |
| 5,528,322 A | 6/1996 | Jinkerson |
| 5,543,504 A | 8/1996 | Jinkerson |
| 5,556,931 A | 9/1996 | Imura |
| 5,603,774 A | 2/1997 | LeBoeuf |
| 5,608,471 A | 3/1997 | Miller |
| 5,639,850 A | 6/1997 | Bryant |
| 5,654,350 A | 8/1997 | Nunez |
| 5,662,707 A | 9/1997 | Jinkerson |
| 5,674,960 A | 10/1997 | Namdaran |
| 5,693,095 A | 12/1997 | Freeman |
| 5,728,157 A | 3/1998 | Prescott |
| 5,741,883 A | 4/1998 | Bryant |
| 5,776,191 A | 7/1998 | Mazzocco |
| 5,789,463 A | 8/1998 | Odagiri |
| 5,814,680 A | 9/1998 | Imafuku |
| 5,821,306 A | 10/1998 | Hodd |
| 5,842,971 A | 12/1998 | Yoon |
| 5,849,841 A | 12/1998 | Muhlebach |
| 5,855,825 A | 1/1999 | Ito |
| 5,856,370 A | 1/1999 | Chmelir |
| 5,861,031 A | 1/1999 | Namdaran |
| 5,891,931 A | 4/1999 | LeBoeuf |
| 5,922,550 A | 7/1999 | Everhart |
| 5,922,821 A | 7/1999 | LeBoeuf |
| 5,945,498 A | 8/1999 | Hopken |
| 6,030,078 A | 2/2000 | Ocampo |
| 6,048,951 A | 4/2000 | Wunsch et al. |

(Continued)

FOREIGN PATENT DOCUMENTS

| | | | |
|---|---|---|---|
| EP | 0 485 197 | * | 5/1992 |
| EP | 0485197 B1 | | 10/1996 |
| EP | 0826158 B1 | | 9/1999 |
| EP | 0820601 B1 | | 12/1999 |

(Continued)

OTHER PUBLICATIONS

Acrylens™, "A technical evaluation of foldable intraocular lenses," distributed by Ioptex Research, Inc. (1990) (Deleted from website, possibly available from web archival site.).
Acrysof® Natural single piece IOL, Product Monograph © 2004 by Alcon Laboratories, Inc.
Koch, D.D., "Alcon AcrySof™ Acrylic intraocular lenses," Slack Inc. (1993) 8:161-177.
Luo et al., "Modification of Natural Polymers: Hyaluronic Acid," *Methods of Tissue Eng.* (A. Atala & R. Lanza eds.) (2002) Academic Press, Orlando, FL, 539-553.

(Continued)

*Primary Examiner*—Ling-Sui Choi
(74) *Attorney, Agent, or Firm*—Grady J. Frenchick; Whyte Hirschboeck Dudek S.C.

(57) ABSTRACT

This invention relates to novel copolymers preferably for intraocular lenses ("IOL"), contact lens, and other ophthalmic and optical applications.

This invention, in one aspect, relates to copolymer compositions comprising limited amounts of a monomer having a naphthyl moiety or naphthyl functionalities, naphthalene, or a naphthyl group.

8 Claims, No Drawings

U.S. PATENT DOCUMENTS

| | | | |
|---|---|---|---|
| 6,149,692 | A | 11/2000 | Lally |
| 6,150,479 | A | 11/2000 | Klemarczyk |
| 6,201,061 | B1 | 3/2001 | Amagai |
| 6,201,089 | B1 | 3/2001 | Carter |
| 6,218,463 | B1 | 4/2001 | Molock |
| 6,265,465 | B1 | 7/2001 | Benz |
| 6,271,281 | B1 | 8/2001 | Liao |
| 6,281,319 | B1 | 8/2001 | Mentak |
| 6,673,888 | B2 | 1/2004 | Kosaka |
| 2001/0049400 | A1 | 12/2001 | Alli |
| 2002/0037984 | A1 | 3/2002 | Vanderbilt |
| 2002/0042483 | A1 | 4/2002 | Vanderbilt |
| 2002/0042484 | A1 | 4/2002 | Vanderbilt |
| 2002/0049290 | A1 | 4/2002 | Vanderbilt |
| 2002/0064513 | A1 | 5/2002 | Maitra |
| 2002/0156047 | A1 | 10/2002 | Zhao |
| 2003/0099694 | A1 | 5/2003 | Ceve |
| 2003/0170893 | A1 | 9/2003 | Unger |
| 2004/0063200 | A1 | 4/2004 | Chaikof |
| 2004/0147501 | A1 | 7/2004 | Dolmans |
| 2004/0156880 | A1 | 8/2004 | Ravi |

FOREIGN PATENT DOCUMENTS

| | | |
|---|---|---|
| GB | 2171106 A | 8/1986 |
| GB | 2381482 A | 5/2003 |
| WO | WO 9325593 | 12/1993 |
| WO | WO 9505164 | 2/1995 |
| WO | WO 9522991 | 8/1995 |
| WO | WO 9618498 | 6/1996 |
| WO | WO 9631791 | 10/1996 |
| WO | WO 9636890 | 11/1996 |
| WO | WO 9640303 | 12/1996 |
| WO | WO 9724382 | 7/1997 |
| WO | WO 9853920 | 12/1998 |
| WO | WO 9901034 | 1/1999 |
| WO | WO 0014591 | 3/2000 |
| WO | WO 00/34804 * | 6/2000 |
| WO | WO 0034804 | 6/2000 |
| WO | WO 0118078 | 3/2001 |
| WO | WO 0118079 | 3/2001 |
| WO | WO 0125301 | 4/2001 |
| WO | WO 0209647 | 2/2002 |
| WO | WO 03000777 | 1/2003 |
| WO | WO 2004044012 | 5/2004 |

OTHER PUBLICATIONS

Martin, R.G. et al, "Foldable Intraocular Lenses," (1993).

Packard et al., "Poly-HEMA as a material for intraocular lens implantation: a preliminary report," *J. Opthal.* (1981) 65:585-587.

Prouty et al., "Fibroblast-Dependent Induction of a Murine Skin Lesion with Similarity to Human Common Blue Nevus," *Am. J. Pathol.* (1996) 148(6):1871-1885.

Tomihata et al., "Crosslinking of Hyaluronic Acid and Water-Soluble Carbodiimide," *J. Biomed. Mater. Res.* (1997) 37(2):243-251.

Wang, "Synthesis and properties of benzotriazoles as UV absorbers," *J. East China Univ. of Sci Tech.* (1999) 25(2):167-169, 173.

www.medennium.com/prod_cataract.htm, "Silicone SQ IOL Model 301," (May 2, 2005) pp. 1-3.

www.amo-inc.com/site/products/consumers, "*Sensar ®*," (May 2, 2005).

http://www.alconlabs.com, "All About Cataracts, the AcrySof®™ IOL Story," (2003) 1-3.

* cited by examiner

HIGH REFRACTIVE INDEX POLYMERS FOR OPHTHALMIC APPLICATIONS

CROSS REFERENCE TO RELATED APPLICATIONS

This application claims the benefit of the priority of provisional application Ser. No. 60/552,548 filed Mar. 12, 2004 which is incorporated by reference herein in its entirety.

BACKGROUND OF THE INVENTION

This invention relates to novel copolymers preferably for intraocular lenses ("IOL"), contact lens, and other ophthalmic and optical applications.

SUMMARY OF THE INVENTION

This invention, in one aspect, relates to copolymer compositions comprising limited amounts of a monomer having a naphthyl moiety or naphthyl functionalities, naphthalene, or a naphthyl group. Naphthyl moiety monomers are added to the comonomer to increase the refractive index of the comonomer and to increase the ability of the copolymer material to block blue light (wavelength up to 475 nm). IOLs made from the materials of this invention have very high refractive index, and may be machined at around room temperature. IOLs of this invention may be folded and used to replace a defective natural lens of the eye by insertion of the IOL through a small incision without the need for further processing or hydration. A particular advantage of the materials of this invention, especially when used for ophthalmic applications, is their ability to block blue light, believed to be harmful to the retina, without the need for inclusion of additional dyes or pigments and without interfering with a user's color perception.

The compositions comprise copolymers of monomers including: an aryl acrylate first monomer, a homopolymer of the aryl acrylate first monomer having a refractive index of at least about 1.5, the first monomer being present in the copolymer in an amount of at least about 50 weight percent, preferably about 70-90 weight %. The composition further includes a second monomer containing a naphthyl moiety, the naphthyl moiety monomer being present in the composition at a concentration of at least 10% and preferably up to about 60%. The composition then includes a crosslinking monomer, the crosslinking monomer being present at a concentration in the range up to 10 weight percent, preferably of about 1 weight % to about 8 weight %. One skilled in the art will appreciate that the weight percentages of the classes of monomers, including any additional added monomers, processing agents, additions, etc., will equal 100 weight percent.

The copolymers polymerized from the monomers stated above are rigid enough to be machined at around room temperature. A unique aspect of the copolymers of this invention is that their refractive indices are so high that lenses can be made thin enough to be folded without further processing or hydration.

Another unique aspect of the compositions of the present invention is their ability to block harmful blue light (475 nm) without the need for additional UV inhibitors, dyes, or pigments in the copolymer.

A method of this invention includes producing a copolymer material in a convenient rod configuration by copolymerizing the above mentioned monomers using radical polymerization. Blanks in the form of disks are cut from the rod and lathe cut into lenses. One skilled in the art will be generally familiar with these steps. Lathing operations are performed at temperatures approximately room temperature. Due to the unique combination of high refractive index and mechanical properties, lenses made from these materials are thin enough (i.e., they have a thickness in the range of about 0.2 mm to about 0.7 mm) to be folded without breakage.

Preparation of Copolymer Rods

The monomers are mixed in a glass flask using a magnetic stir bar, at room temperature, 15° C., for at least 20 minutes. A total of 20 g of the comonomer mixture is used to prepare a 6-inch rod. A radical polymerization initiator trade named Vazo is added at a concentration of 0.1% and the mixture stirred for an additional 20 minutes. The comonomer solution is filtered through a 0.2 micron filter, poured into a glass tube, and then vacuum/argon degassed for 5 minutes. The test tubes are placed in a water bath at 55 degrees C. for 12 hours and then cured in an oven at 70 degrees C. for an additional 12 hours. The copolymer rods are removed from the glass test tubes and stored until use.

IOL Lathe Cutting

Blanks with a 15 mm diameter and a 2 mm thickness are cut from the polymer rod and lathed into a lens optic with diopters ranging from 4 to 40. These lenses have good optical properties including clarity, visible light transmission, and resolution. The lenses can easily be folded using forceps or conventional IOL injectors without breakage. The lenses unfold slowly and controllably in the eye without damaging surrounding tissue. They also do not exhibit any substantial "memory" returning to their unfolded configuration.

Preferred aryl acrylate monomers for use in the present invention include 2-phenyl ethyl acrylate (PEA) and benzyl acrylate (BA). Other aryl acrylate monomers include aryl (meth)acrylate monomers such as, for example: ethylene glycol phenyl ether acrylate (EGPEA), poly(ethylene glycol phenyl ether acrylate) (polyEGPEA), phenyl methacrylate, 2-ethylphenoxy methacrylate, 2-ethylphenoxy acrylate, hexylphenoxy methacrylate, hexylphenoxy acrylate, benzyl methacrylate, 2-phenylethyl methacrylate, 4-methylphenyl methacrylate, 4-methylbenzyl methacrylate, 2-2-methyphenylethyl methacrylate, 2-3-methylphenylethyl methacrylate, 2-4-methylphenylethyl methacrylate, 2-(4-propylphenyl)ethyl methacrylate, 2-(4-(1-methylethyl)pheny)ethyl methacrylate, 2-(4-methoxyphenyl)ethylmethacrylate, 2-(4-cyclohexylpheny)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-phenylphenyl)ethyl methacrylate), 2-(4-benzylphenyl)ethyl methacrylate, and the like, including the corresponding methacrylates and acrylates, and including mixtures thereof. Other aryl acrylate monomers and aryl methacrylate monomers are likely to occur to one skilled in this art in light of the present disclosure.

A preferred naphthyl moieties or naphthalene derivatives includes 2-vinyl naphthylene 2-VN. Other naphthalene moieties include naphthyl acrylate, naphthylmethacrylate. A preferred crosslinker for use in the present invention is ethylene glycol dimethacrylate EGDM. One skilled in this art will appreciate that there are numerous other crosslinking monomers which are likely to be successfully used herein.

EXAMPLES 1-6

Using the general method described above, the following 6 comonomers were used to prepare copolymers.

| Monomer | Naphthalene additive | Crosslinker | RI | Thickness 20D lens |
|---|---|---|---|---|
| 1. PEA (89%) | 2-VN (9%) | EGDM (2%) | 1.58 | 0.45 mm |
| 2. PEA (84%) | 2-VN (14%) | EGDM (2%) | 1.59 | 0.40 mm |
| 3. PEA (69%) | 2-VN (29%) | EGDM (2%) | 1.60 | 0.36 mm |
| 4. BA (89%) | 2-VN (9%) | EGDM (2%) | 1.59 | 0.40 mm |
| 5. BA (84%) | 2-VN (14%) | EGDM (2%) | 1.59 | 0.40 mm |
| 6. BA (69%) | 2-VN (29%) | EGDM (2%) | 1.60 | 0.36 mm |

PEA: 2-phenyl ethyl acrylate, BA: Benzyl acrylate, 2-VN: 2-vinyl naphthalene, EGDM: ethylene glycol dimethacrylate.

The copolymer rods of Examples 1-6 were lathe cut into discs approximately the size of an IOL optic i.e., about 15 mm in diameter. The refractive indices of the discs (RI) were determined and are shown in the table. The thicknesses of the optic discs also were measured and are listed in the table. As a comparison, the highest refractive index material available is that of Acrysof lens (1.55). The thickness of a 20D Acrysof lens is 0.8 mm. which makes a substantial difference in incision size.

EXAMPLE 7

IOLs made from materials of the present invention are stored in a dry state in a sterile tray. Employing the copolymer of the invention, cataract surgery may be carried out through an incision of 2.0 mm or less. After applying topical anesthesia to the eye, an IOL made of the new copolymer materials may be injected into the eye using an inserter or a folding device.

The IOL will unfold slowly to allow the surgeon to optimize placement. The IOL will unfold completely within 30 seconds to 1 minute. The memory of the materials of the present invention are such that the IOL recovers all optical and physical properties upon unfolding.

What is claimed is as follows:

1. A copolymer comprising:
   a) an aryl acrylate monomer, a homopolymer of the aryl acrylate monomer having a refractive index of at least about 1.5, the aryl acrylate monomer being present in the resulting copolymer in an amount of at least about 50 weight %;
   b) a monomer comprising a napthyl moiety, the napthyl moiety-comprising monomer being present in the copolymer at a concentration of at least about 10 weight %; and
   c) a crosslinking monomer, the crosslinking monomer being present at a concentration in the range up to about 10 weight %.

2. A composition according to claim 1 wherein the aryl acrylate monomer comprises aryl-(meth)acrylate.

3. A composition according to claim 1 wherein the aryl acrylate monomer comprises at least 70 weight % of the copolymer.

4. A composition according to claim 1 wherein the aryl acrylate monomer comprises about 70-90 weight % of the copolymer.

5. A composition according to claim 1 wherein the aryl acrylate monomer comprises aryl-(meth)acrylate.

6. A composition according to claim 1 wherein the aryl acrylate monomer comprises at least 70 weight % of the copolymer.

7. A composition according to claim 1 wherein the aryl acrylate monomer comprises about 70-90 weight % of the copolymer.

8. A copolymer consisting essentially of:
   a) an aryl acrylate monomer, a homopolymer of the aryl acrylate monomer having a refractive index of at least about 1.5, the aryl acrylate monomer being present in the resulting copolymer in an amount of at least about 50 weight %;
   b) a monomer containing a napthyl moiety, and napthyl moiety-containing being present in the copolymer at a concentration of at least about 10 weight %; and
   c) a crosslinking monomer, the crosslinking monomer being present at a concentration in the range up to about 10 weight %.

* * * * *